(12) United States Patent
Nummila-Pakarinen et al.

(10) Patent No.: US 6,562,905 B1
(45) Date of Patent: May 13, 2003

(54) HIGH DENSITY POLYETHYLENE COMPOSITIONS, A PROCESS FOR THE PRODUCTION THEREOF AND FILMS PREPARED

(75) Inventors: Auli Nummila-Pakarinen, Porvoo (FI); Ole Jan Myhre, Pregarten (AT); Jarmo Lindroos, Stathelle (NO); Solveig Johansson, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/647,846

(22) PCT Filed: Apr. 6, 1999

(86) PCT No.: PCT/FI99/00289

§ 371 (c)(1),
(2), (4) Date: Nov. 9, 2000

(87) PCT Pub. No.: WO99/51649

PCT Pub. Date: Oct. 14, 1999

(30) Foreign Application Priority Data

Apr. 6, 1998 (FI) .................................................. 980788
May 8, 1998 (FI) .................................................. 981034

(51) Int. Cl.[7] ........................... C08F 10/02; C08L 23/00; C08L 23/04; B29D 22/00; B29D 23/00
(52) U.S. Cl. ..................... 525/191; 525/240; 428/34.1; 428/35.2; 428/35.5; 428/35.7; 428/36.92
(58) Field of Search .................................. 525/191, 240; 428/34.1, 35.2, 35.5, 35.7, 36.92

(56) References Cited

U.S. PATENT DOCUMENTS

| 4,547,551 A | 10/1985 | Bailey et al. |
| 5,306,775 A | 4/1994 | Martin et al. |
| 5,338,589 A | 8/1994 | Bohm et al. |
| 5,494,965 A | 2/1996 | Harlin et al. |
| 6,316,546 B1 * | 11/2001 | Ong et al. ..................... 525/53 |

FOREIGN PATENT DOCUMENTS

| WO | WO95 11264 | 4/1995 |
| WO | WO95 35323 | 12/1995 |
| WO | 209844011 | 10/1998 |

OTHER PUBLICATIONS

Nitikin, N. I. "The Chemistry of Cellulose and Wood", Israel Program for Scientific Translations, 1966. Jerusalem. pp. 62–71.*

* cited by examiner

Primary Examiner—Nathan M. Nutter
(74) Attorney, Agent, or Firm—Birch, Stewart, Kolasch & Birch, LLP

(57) ABSTRACT

The present invention concerns a bimodal film-making HDPE composition, a process for the preparation thereof, a film prepared thereof and a film-making process. The composition comprises at least one polyethylene component having a relatively low molecular weight and another polyethylene component having a relatively high molecular weight. The composition has a shear thinning index defined by the relationship:

$$SHI_{5/300} \leq 0.00014\, \eta_{5kPa} + 78$$

wherein $\eta_{5kPa}$ is the complex viscosity at $G^*=5$ Pa and $SHI_{5/300}$ is the ratio of complex viscosity at $G^*=5$ kPa to the complex viscosity at $G^*=300$ kPa.

By means of the invention it is possible to produce material for making HDPE blown films with good mechanical properties in a process where the whole range of PE products from LLD to HD can be produced.

8 Claims, 2 Drawing Sheets

HIGH DENSITY POLYETHYLENE COMPOSITIONS, A PROCESS FOR THE PRODUCTION THEREOF AND FILMS PREPARED

This application is the national phase under 35 U.S.C. §371 of PCT International Application No. PCT/FI99/00289 which has an International filing date of Apr. 6, 1999, which designated the United States of America.

BACKGROUND OF THE INVENTION

1. Field of the Invention

The present invention relates to polymer films. In particular, the present invention relates to high density polyethylene compositions and polymer films blown from such polyethylene compositions and having good impact and mechanical properties and processability. The invention also concerns a process for the production of the polymer compositions and the film-making process.

2. Description of Related Art

There is a growing demand for thinner films (downgauging) due to environmental aspects and cost reduction. Since film strength and performance in packaging lines should be maintained in spite of the downgauging, stiffer films with high mechanical properties are needed to meet future demands.

The polyolefin materials used for blown film applications can be divided into the following five groups of materials:

1) Low Density Polyethylene (LDPE) having broad molecular weight distribution (MWD) and produced by radical polymerisation in one reactor;
2) Linear Low Density Polyethylene (LLDPE) having narrow MWD and produced by polymerization in the presence of Ziegler catalysts in one reactor
3) High Density/Medium Density Polyethylene (HD/MDPE) having broad MWD and produced by polymerization in the presence of Cr catalysts in one reactor
4) High Density Polyethylene (HDPE) having a bimodal (broad) MWD) and produced by polymerization in the presence of Ziegler catalysts in two reactors in series (cascade)
5) Linear Low Density Polyethylene (LLDPE) having a bimodal (broad) MWD and produced by polymerization in the presence of Ziegler catalysts in two cascaded reactors.

The market for PE films is continuously developing improved solutions to packaging requests based on the above type of materials.

Unimodal HD film materials (point 3 above) have a high stiffniess, but limited processability and mechanical properties. The density may be reduced to improve the mechanical properties but this results in reduced stiffniess.

Bimodal HD film materials (point 4 above) also have high stiffness, but compared to unimodal materials they have good processability and good mechanical properties over a wider range of processing conditions as well. Typically these materials have been produced in cascaded slurry reactors. Said processes are suitable for production of HDPE materials, but unfortunately they are not flexible enough to allow for the production of MDPE and LLDPE materials.

It is also possible to produce a bimodal HDPE film material in a more flexible process, like the one presented in EP 517 868 B1, comprising a combination of slurry and gas phase reactors, which provides for a wider variation of polymerization conditions. However, attempts to reproduce the conventional materials made in a cascaded slurry process in this kind of a process have usually resulted in a material which cannot be used in film applications, due to either a limited processability or a too high gel level. Similar problems are encountered in processes comprising cascaded gas phase reactors.

SUMMARY OF THE INVENTION

It is an object of the present invention to eliminate the problems of the prior art and to provide novel blown polymer films. In particular the invention aims at eliminating the problems of the production of HDPE materials in multireactor processes comprising combinations of slurry and gas phase reactors or cascaded gas phase reactors.

It is another object of the present invention to provide a process for producing suitable polyethylene materials for production of films, in particular blown films.

These and other objects, together with the advantages thereof over known processes and products, which shall become apparent from, the specification which follows, are accomplished by the invention as hereinafter described and claimed.

As described above, the currently used HD film materials have generally been produced in cascaded slurry reactors. It has now been found that materials which can be used for making high density PE films with good processability and good properties can also be produced in a process comprising a cascade of loop and gas phase reactors or several gas phase reactors.

The invention is based on the finding that the properties of HD film materials made in slurry processes can be matched by a special combination of the average molecular weight. and molecular weight distribution which is produced in the above-mentioned processes. Surprisingly, the properties of the films made from such materials will be equal or even improved compared to films produced from conventional bimodal HDPE.

The specific combination of average molecular weight and molecular weight distribution is manifested in a reduced shear thinning index and increased storage modulus in comparison to conventional materials. The shear thinning index of the materials according to the present invention can be defined as follows:

$$SHI_{5/300} \leq 0,00014 \eta_{5kPa} + 78$$

wherein $\eta_{5kPa}$ is complex viscosity at $G^*=5$ kPa and $SHI_{5/300}$ is the ratio of complex viscosity at $G^*=5$ kPa to the complex viscosity at $G^*=300$ kPa.

The present material is preferably produced by polymerizing or copolymerizing ethylene in a reactor cascade formed by at least two reactors, one of which is a gas phase reactor, operated with different amounts of hydrogen and comonomers to produce a high molecular weight portion in one of the reactors and a low molecular weight portion in another so as to provide a bimodal high density polyethylene with a low molecular weight part having a density above 960 kg/m$^3$ and a high molecular weight part, the composition having a density of 940–965 kg/m$^3$ and MFR$_{21}$ of 3–50.

More specifically, the present polyethylene composition is characterized by what is stated in the characterizing part of claim 1.

The process according to the present invention is mainly characterized by what is stated in the characterizing part of claim 7.

The present process for producing high density polyethylene films is characterized by what is stated in the characterizing part of claim 15.

The present polyethylene film is characterized by what is stated in the characterizing part of claim 21.

The advantage of the present invention is that it provides a material for making high density PE blown films with good mechanical properties and good appearance in a process where the whole range of PE products from LLD to HD can be produced. The material is comparable to that produced in cascaded slurry reactors, allowing the production of HD products only. Further, the use of a light diluent in the slurry reactor and at least one gas. phase reactor reduces the amount of volatiles present in the product. Such volatiles typically stem from heavy diluents used in slurry polymerization. Typically, the amount of volatiles in the HDPE material according to the present invention is less than 500 ppm, in particular less than 300 ppm.

The tear strength, impact strength and processability on a film line make the present materials useful for production of thin films of thicknesses in the range of 5 $\mu$m, or even less than 5 $\mu$m, to over 30 $\mu$m. Films made from the materials also exhibit good barrier properties to water vapor.

Next, the invention will be more closely examined with the aid of the following detailed description and with reference to the attached drawings.

DETAILED DESCRIPTION OF THE INVENTION

Definitions

Figure 1:
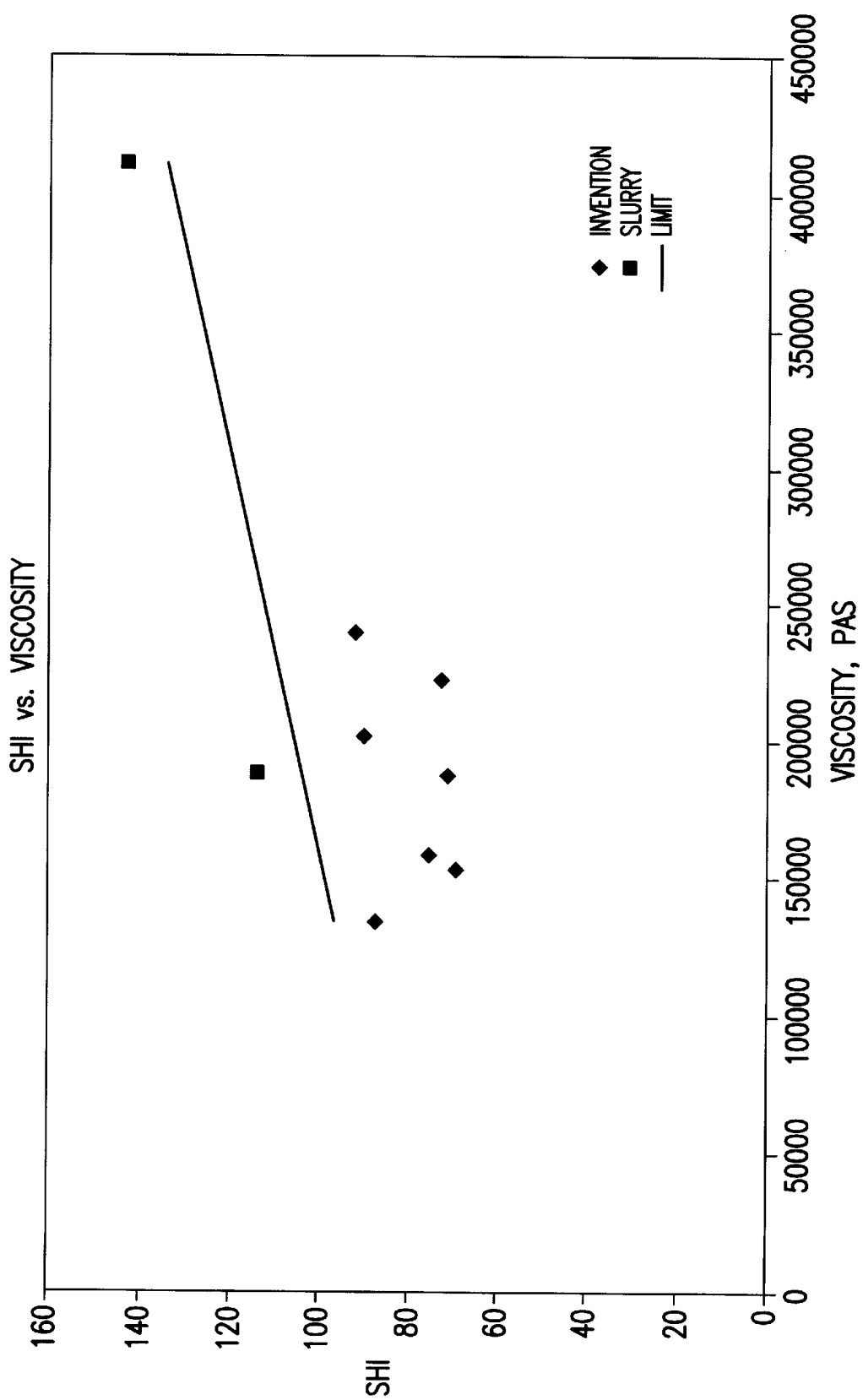
FIG. 1 shows the shear thinning index, SHI, as a function of $\eta_{5kPa}$ of the present materials compared with conventional materials made in a slurry process.

For the purpose of the present invention, "slurry reactor" designates any reactor, such as a continuous or simple batch stirred tank reactor or loop reactor, operating in slurry and in which the polymer forms in particulate form. According to a preferred embodiment the slurry reactor comprises a loop reactor.

By "gas phase reactor" is meant any mechanically mixed or fluid bed reactor. Preferably the gas phase reactor comprises a mechanically agitated fluid bed reactor with gas velocities of at least 0.2 m/sec.

By "Melt Flow Rate" or abbreviated "MFR" is meant the weight of a polymer extruded through a standard cylindrical die at standard temperature in a melt indexer carrying a standard piston and load. MFR is a measure of the melt viscosity of a polymer and hence also of its molar mass. The abbreviation "MFR" is generally provided with a numerical subindex indicating the load of the piston in the test. Thus, e.g., $MFR_2$ designates a 2.16 kg load and $MFR_{21}$ a load of 21.6 kg. MFR can be determined using, e.g., by one of the following tests: ISO 1133 C4, ASTM D 1238 and DIN. 53735.

By "Flow Rate Ratio" or abbreviated FRR is meant a ratio between two MFR values measured from the same polymer using different loads. The abbreviation FRR is generally provided with a subindex indicating which loads have been used to determine the FRR. Thus $FRR_{21/5}$ has been obtained as a ratio of $MFR_{21}$ to $MFR_5$. The FRR is a measure of the broadness of the MWD. A high FRR corresponds to a broad MWD.

The complex viscosity at $G^*=5$ kPa, denoted $\eta_{5kPa}$, is measured using a dynamic rheometer. It is a measure of the average molecular weight of the polymer. In the case of the bimodal polyethylene, the viscosity, $\eta_{5kPa}$, is most effectively controlled by the molecular weight of the high molecular weight component. Thus, to increase $\eta_{5kPa}$ one has to increase the molecular weight of the high molecular weight component and to decrease $\eta_{5kPa}$ one has to decrease the molecular weight of the high molecular weight component. It should be noted, however, that the viscosity is also to some extent influenced by the molecular weight distribution.

The shear thinning index, $SHI_{5/300}$, is defined as the ratio of the viscosity at $G^*=300$ kPa to the complex viscosity at $G^*=5$ kPa. It is a measure of the molecular weight distribution. In the case of the bimodal polyethylene, the shear thinning index is most effectively controlled by the split, or the ratio of the fraction of the low molecular weight component to the fraction of the high molecular weight component in the final composition. Thus, to increase the shear thinning index one has to increase the fraction of the low molecular weight component. The shear thinning index is to some extent also influenced by the molecular weights of the low and high molecular weight components.

The storage modulus, G', at the point where the loss modulus has a specified value of 5 kPa, G"=5 kPa, denoted as $G'_{5kPa}$, is also a function of molecular weight distribution. It is sensitive to the very high molecular weight polymer fraction. The storage modulus can be controlled by the combination of the molecular weight of the high molecular weight component and the fraction of the high molecular weight component. The storage modulus can be increased by increasing the molecular weight of the high molecular weight component.

The Polymer Composition

The present invention concerns a high density polyethylene composition having a bimodal molar mass distribution comprising a relatively high molar mass portion and a relatively low molar mass portion. The high molar mass portion contains comonomers which improve the mechanical properties of the polymer.

Figure 2:
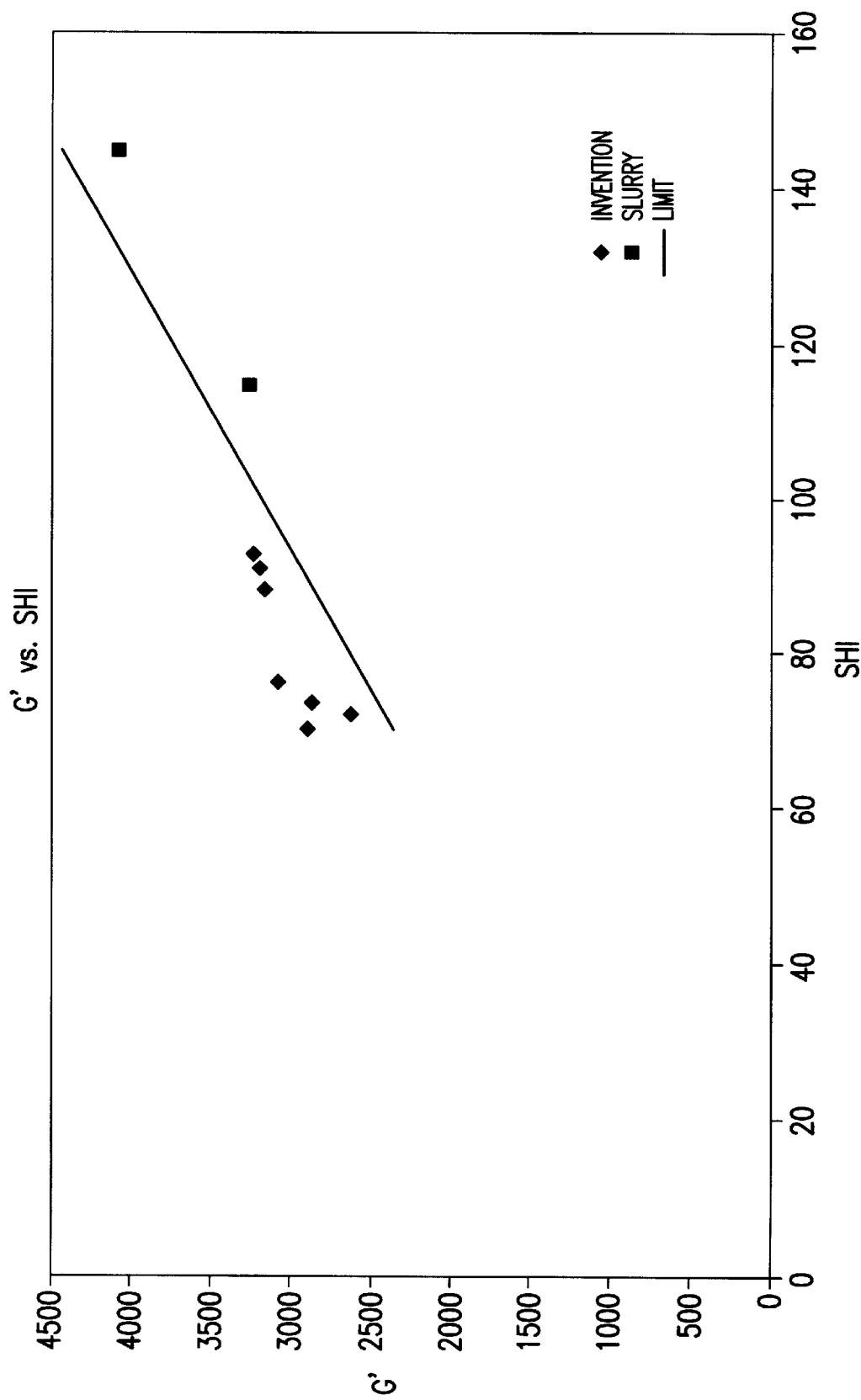
FIG. 2 shows the storage modulus, G', as a function of the shear thinning index for both prior art and present materials.

FIG. 1 shows the $SHI_{5/300}$, as a function of $\eta_{5kPa}$ both for materials from a slurry process as well as the material according to the present invention. FIG. 2 shows the value of $G'_{5kPa}$, as a function of $SHI_{5/300}$, again for both prior art and the present materials. The graphical representations of FIGS. 1 and 2 have been drafted based on the data obtained from Reference Examples 1 and 2 and Examples 2 to 7 and the further include data on a seventh material according to the present invention.

FIG. 1 shows that, at the same viscosity, the SHI of the inventive material is lower than that of the traditional materials. The processability of the material on the film line, as well as the mechanical and visual properties of the film are similar, however.

FIG. 2 shows that, at a specific level of SHI, the G' of the present material is higher than that of the traditional materials.

From FIG. 1 it can be seen that for the materials according to the present invention the following relationship is valid:

$$SHI_{5/300} \leq 0.00014 \cdot \eta_{5Pa} + 78$$

while the opposite is true for traditional materials.

FIG. 2 shows that for the present materials:

$$G_{5kpa} \geq 28 \cdot SHI_{5/300} + 425$$

while again the opposite holds for traditional materials.

The above discussion shows that in order to match the properties of a HD film material produced in a slurry process, the molecular weight distribution needs to be quite different. Attempts to reach the SHI level of the conventional slurry materials would lead to a film containing too high an amount of gels for commercial use of the film.

A material according to the present invention contains 5–95%, preferably 50–95%, and in particular 50–90%, high molecular weight polymer and 5–95%, preferably 5–50% and in particular 10–50%, low molecular weight polymer. The amounts are calculated on basis of the weight of the polymer material. The melt flow rate of the composition measured with a 21 kg load, $MFR_{21}$, is in the range of 3 to 50 g/10 min, in particular 3 to 15 g/10 min. The density of the composition is in a range of 940–965 kg/m$^3$.

According to a preferred embodiment, a material according to the present invention contains 70–30%, preferably 70–50%, and in particular 65–55%, high molecular weight polymer and 30–70%, preferably 30–50% and in particular 35–45%, low molecular weight polymer. The amounts are, again, calculated on basis of the weight of the polymer material.

Typically, the film blown from the present material has a dart drop higher than 200 g. The number of gels is typically lower than 50 according to the manual gel determination method presented below.

Polymerization Process

To produce the polymer compositions, ethylene is polymerized in the presence of a suitable catalyst, preferably a Ziegler-Natta catalyst (cf. below) or a single-site catalyst, at an elevated temperature and pressure. Polymerization is carried out in a series of polymerization reactors selected from the group of slurry and gas phase reactors. A loop reactor is a particularly preferred embodiment of polymerization in slurry reactors. The relatively high molar mass portion and the relatively low molar mass portion of the product can be prepared in any order in the reactors.

In the following the reactor system will be described with particular reference to a system akin to the one disclosed in EP Patent Specification No. 0 517 868 and comprising one loop reactor (referred to as "the first reactor") and one gas phase reactor (referred to as "the second reactor"), in that order. However, it should be understood that the reactor system can comprise the reactors in any number and order.

In every polymerization step it is possible to use also comonomers selected from the group of $C_{3-18}$ olefins, preferably $C_{4-10}$ olefins, such as 1-butene, 1-pentene, 1-hexene, 4-methyl-1-pentene, 1-heptene, 1-octene, 1-nonene and 1-decene as well as mixtures thereof. The use of comonomers is particularly preferred for the preparation of the high molar mass portion. The amount of comonomers in the present materials is generally 0 to 5 wt-%, preferably less than about 2 wt-%. The low molecular weight component contains less than about 1 wt-% comonomer units.

In addition to the actual polymerization reactors used for producing the bimodal ethylene homo- or copolymer, the polymerization reaction system can also include a number of additional reactors, such as prereactors. The prereactors include any reactor for pre-polymerizing the catalyst and for modifying the olefinic feed, if necessary. All reactors of the reactor system are preferably arranged in series (in a cascade).

According to the invention, the polymerization comprises the steps of subjecting ethylene, optionally hydrogen and/or comonomers to a first polymerization reaction in a first reaction zone or reactor, recovering the first polymerization product from the first reaction zone, feeding the first polymerization product to a second reaction zone or reactor, feeding additional ethylene and optionally hydrogen and/or comonomers to the second reaction zone, subjecting the additional ethylene and optional hydrogen and/or comonomer to a second polymerization reaction in the presence of the first polymerization product to produce a second polymerization product, and recovering the second polymerization product from the second reaction zone.

Thus, in the first step of the process, ethylene with the optional comonomer(s) together with the catalyst is fed into the first polymerization reactor. Along with these components hydrogen as a molar mass regulator is fed into the reactor in the amount required for achieving the desired molar mass of the polymer. Alternatively, the feed of the first reactor can consist of the reaction mixture from a previous reactor, if any, together with added fresh monomer, optional hydrogen and/or comonomer and cocatalyst. In the presence of the catalyst, ethylene and the optional comonomer will polymerize and form a product in particulate form, i.e. polymer particles, which are suspended in the fluid circulated in the reactor.

The polymerization medium typically comprises the monomer (i.e. ethylene) and/or a hydrocarbon, and the fluid is either liquid or gaseous. In the case of a slurry reactor, in particular a loop reactor, the fluid can be a liquid or a so called supercritical fluid where the temperature and pressure in the reactor are higher than the critical temperature and pressure of the fluid. The polymer is circulated continuously through the slurry reactor by means of an agitator, or in the case on a loop reactor, by means of a circulation pump.

The slurry polymerization is conducted in an inert hydrocarbon diluent. Preferably, propane used, since this allows for operation at supercritical conditions at a relatively low temperature.

The conditions of the slurry reactor are selected so that at least 20 wt-%, preferably at least 35 wt-%, of the whole production is polymerized in the slurry reactor(s). The temperature is in the range of 40 to 110° C., preferably in the range of 70 to 100° C. The reaction pressure is in the range of 25 to 100 bar, preferably 35 to 80 bar. In order to produce a polyethylene having a density in excess of 960 kg/m$^3$, the polymerization is preferably carried out at supercritical conditions at temperatures over 90° C.

In slurry polymerization more than one reactor can be used in series. In such a case the polymer suspension in an inert hydrocarbon produced in the slurry reactor is fed without separation of inert components and monomers periodically or continuously to the following slurry reactor, which acts at lower pressure than the previous slurry reactor.

The polymerization heat is removed by cooling the reactor by a cooling jacket. The residence time in the slurry reactor must be at least 10 minutes, preferably 20-100 min for obtaining a sufficient degree of polymerization.

As discussed above, if a low molar mass polyethylene is the desired product, hydrogen is: fed into the reactor. Hydrogen can be added to the reactor at ratio of at least 100 mol $H_2$/kmol ethylene, preferably 300–600 mol $H_2$/kmol. ethylene. Comonomer can be added so that the ratio of comonomer to ethylene is at the most 200 mol/kmol. Preferably no comonomer is used. If the high molecular weight component is to be produced in the loop reactor, then hydrogen and comonomer is fed into the reactor. Hydrogen is fed so that the amount of hydrogen is low compared to ethylene, the ratio between hydrogen and ethylene being less than 50 mol/kmol, preferably less than 20 mol/kmol. Comonomer is fed so that the ratio between comonomer and ethylene is less than 400 mol/kmol, preferably less than 250 mol/kmol.

The pressure of the first polymerization product including the reaction medium is reduced after the first reaction zone in order to evaporate volatile components of the product, e.g. in a flash tank. As a result of the flashing, the product stream containing the polyethylene is freed from hydrogen and can be subjected to a second polymerization in the presence of additional ethylene to produce a high molar mass polymer.

The second reactor is preferably a gas phase reactor, wherein ethylene and preferably comonomers are polymerized in a gaseous reaction medium.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and propane and also hydrogen as a modifier. The fluidized gas phase reactor can be equipped with a mechanical mixer.

If the high molecular weight component is to be produced in the gas phase reactor, hydrogen is added into the reactor so that the ratio between hydrogen and ethylene is less than 100 mol/kmol, preferably less than 50 mol/kmol. Comonomer is fed in a sufficient amount so as to achieve a ratio between comonomer and ethylene of less than 300 mol/kmol, preferably less than 200 mol/kmol.

If the low molecular weight polymer is produced in the gas phase reactor hydrogen is added into the reaction so that the ratio of hydrogen to ethylene is between 500 and 3000 mol/kmol, preferably between 1000 and 2500 mol/kmol. Comonomer may be added so that its ratio to ethylene is lower than 30 mol/kmol. Preferably no comonomer is used.

The polymerization can also be carried out without a slurry reactor in two or more cascaded gas phase reactors. Either the high molecular weight component or the low molecular weight component is produced in the first reactor.

The gas phase reactor used can be operated in the temperature range of 50 to 115° C., preferably between 60 and 110° C. The reaction pressure is typically between 10 and 40 bar and the partial pressure of monomer between 1 and 20 bar.

The pressure of the second polymerization product including the gaseous reaction medium can then be released after the second reactor in order optionally to separate part of the gaseous and possible volatile components of the product, e.g. in a flash tank. The overhead stream or part of it is recirculated to the second reactor.

The production split between the relatively high molar mass polymerization reactor and the relatively low molar mass polymerization reactor is 5–95:95–5. Preferably, 5 to 50%, in particular 10 to 50%, of the ethylene homopolymer or copolymer is produced at conditions to provide a polymer having a $MFR_2$ of 100 g/10 min or more and constituting the low molar mass portion of the polymer, and 95 to 50%, in particular 90 to 50%, of the ethylene homopolymer or preferably copolymer is produced at such conditions that the final polymer has an $MFR_{21}$ of less than 50 g/10 min, in particular about 3 to 50 g/10 min and constituting the high molar mass portion of the polymer. The density of the low molar mass portion is preferably over 960 kg/m$^3$ and the density of the final polymer is preferably 940 to 965 kg/m$^3$.

According to a preferred embodiment, the production split between the reactors is 30–70/70–30. Also, preferably 30 to 50%, in particular 35 to 45% of the ethylene homopolymer or copolymer is produced at conditions to provide a polymer having a $MFR_2$ of 100 g/10 min or more and constituting the low molar mass portion of the polymer and 70 to 50%, in particular 65 to 55%, of the ethylene homopolymer or preferably copolymer is produced at such conditions that the final polymer has an $MFR_{21}$ of less than 50 g/10 min, in particular about 3 to 50 g/10 min and constituting the high molar mass portion of the polymer.

The total process is, according to a preferred embodiment, conducted as follows. The bimodal high density polyethylene film material is prepared in a process comprising a loop and a gas phase reactor in the presence of an active catalyst. The loop reactor is operated in super critical conditions, and thus the temperature and pressure of the reactor exceed the critical temperature and pressure of the fluid. Propane diluent, catalyst, ethylene and hydrogen are introduced into the reactor, so that an ethylene homopolymer having an $MFR_2$ of about 300–1000 g/10 minis formed. The hydrocarbon slurry is withdrawn from the loop reactor, either continuously or intermittently, and the hydrocarbons are separated from the polymer. The polymer containing the active catalyst is then introduced into a gas phase reactor, where additional ethylene, comonomer, hydrogen and, optionally, an inert gas is introduced and the polymerisation is continued so as to provide a final composition with an $MFR_{21}$ of about 4–12 g/10 min, a density of 940–965 kg/m$^3$, reactor split of about (37–43)/(57–63). The polymer is then taken out if the gas phase reactor, either continuously or intermittently, the hydrocarbons are separated from the polymer and the polymer is compounded using a counter-rotating twin screw extruder.

According to another preferred embodiment of the invention, the total process is conducted as follows. The bimodal high density polyethylene film material is prepared in a process comprising a loop and a gas phase reactor in the presence of a catalyst prepared by depositing titanium tetrachloride on a magnesium dichloride carrier so that the catalyst contains no silica support. Alternatively, a catalyst prepared on silica carrier comprising magnesium dichloride, as disclosed in Example 1, can be used. The loop reactor is operated in super critical conditions, and thus the temperature and pressure of the reactor exceed the critical temperature and pressure of the fluid. Propane diluent, catalyst, ethylene and hydrogen are introduced into the reactor, so that an ethylene homopolymer having an $MFR_2$ of about 300–1000 g/10 minis formed. The hydrocarbon slurry is withdrawn from the loop reactor, either continuously or intermittently, and the hydrocarbons are separated from the polymer. The polymer containing the active catalyst is then introduced into a gas phase reactor, where additional ethylene, comonomer, hydrogen and, optionally, an inert gas is introduced and the polymerisation is continued so as to provide a final composition with an $MFR_{21}$ of about 4–12 g/10 min, a density of 940–965 kg/m$^3$, reactor split of about (37–43)/(57–63). The polymer is then taken out if the gas phase reactor, either continuously or intermittently, the hydrocarbons are separated from the polymer and the polymer is compounded using a corotating or counterrotating twin screw extruder.

Catalyst

Any known Ziegler-Natta type catalyst can be used in the process. The catalyst can be supported on an inert carrier or it can be non-supported. If a supported catalyst is used, it can be supported on any suitable carrier known in the art, in particular a metal oxide or a metal oxide mixture, such as silica, alumina, silica-alumina and silica-titania.

Preferred catalysts comprise titanium tetrachloride on silica or alumina, wherein the support optionally contains magnesium chloride and optionally has been pretreated with an organometal complex. Examples of suitable catalysts are disclosed in WO 95/35323 and in Example 1.

According to a preferred embodiment, the process is conducted by using a catalyst, which is prepared by first providing a support comprising a magnesium halide compound having the formula (I)

$$(OR)_{2-n}MgX_n \quad (I)$$

wherein each same or different R is a $C_1$–$C_{20}$ alkyl or a $C_7$–$C_{26}$ aralkyl, each same or different X is halogen and n is an integer 1 or 2.

Thereafter, the support comprising a magnesium halide compound having the formula (I) is contacted with an alkyl metal halide compound having the formula (II)

$$(R^1_{n^1}MeX^1_{3-n^1})_{m^1} \quad (II)$$

wherein Me is B or Al, each same or different $R^1$ is a $C_1$–$C_{10}$ alkyl, each same or different $X^1$ is a halogen, $n^1$ is an integer 1 or 2, and $m^1$ is an integer 1 or 2, to give a first product.

The first product is contacted with a magnesium composition containing magnesium bonded to a hydrocarbyl and magnesium bonded to a hydrocarbyl oxide and having the empirical formula (III)

$$R^2_{n^2}(OR^3)_{2-n^2}Mg \quad (III)$$

wherein each same or different $R^2$ is a $C_1$–$C_{20}$ alkyl, each same or different $R^3$ is a $C_1$–$C_{20}$ alkyl containing a hetero element, and $n^2$ is between 0.01 and 1.99, to give a second product.

The second product is then contacted with a titanium halide compound having the formula (IV)

$$(OR^4)_{n^3}TiX^2_{4-n^3} \quad (IV)$$

wherein each same or different $R^4$ is a $C_1$–$C_{20}$ alkyl, each same or different $X^2$ is a halogen, $n^3$ is 0 or an integer 1–3, and Ti is quadrivalent titanium.

According to the embodiment, the support is preferably silica. The magnesium halide of formula (I) is preferably magnesium dihalide, most preferably magnesium dichloride. The alkyl metal halide of formula (II) is preferably is an alkyl aluminum dichloride, e.g., ethylalumjnium dichloride (EADC). Furthermore, the composition containing magnesium bonded to a hydrocarbyl and magnesium bonded to a hydrocarbyl oxide and having the empirical formula (III) is the contact product of a dialkyl magnesium and an alcohol, the dialkyl magnesium being preferably dibutyl magnesium, butylethyl magnesium or butyloctyl magnesium and the alcohol being preferably 2-ethylhexanol or 2-propylhexanol. The titanium halide compound of formula (IV) is most preferably titanium tetrachloride.

It is also possible to use said alkyl metal halide compound of formula (II) completely or partially as a cocatalyst. It is, however, preferable to add to the polymerization mixture a cocatalyst having the formula (V)

$$R^6_{n^5}AlX^4_{3-n^5} \quad (V)$$

wherein $R^6$ is a $C_1$–$C_{20}$ alkyl, preferably $C_1$–$C_{10}$ alkyl, most preferably a $C_2$–$C_6$ alkyl such as ethyl, X is halogen, preferably chlorine, n is 1 to 3, more preferably 2 or 3, most preferably 3.

According to another preferred embodiment, the solid catalyst component has been prepared on a silica carrier comprising magnesium dichloride (A), by first contacting the carrier with an alkyl metal halide compound (B), such as ethyl aluminium dichloride to form an intermediate product (C). The intermediate product (C) is then contacted with a magnesium dialkoxy compound (D), such as the reaction product of 2-ethyl-1-hexanol and BOMAG-A (butyl octyl magnesium) at a mole ratio in the area of 1.83:1, to form an intermediate product (E). The intermediate product (E) is then contacted with a titanium halide compound (F), such as titanium tetrachloride, to form a solid polymerization catalyst component. The solid catalyst component is then contacted with a suitable organoaluminum cocatalyst, such as triethylaluminum, trimethylaluminum, trioctylaluminum or diethylaluminum to form the active polymerization catalyst.

Blending and Compounding

The polymer obtained from the reactor is in the form of a powder. Generally, film blowers are not capable of using the polymer in powder form. The powder is therefore transformed to pellets in a compounding step where the polymer is first mixed with additives, like antioxidants and process stabilisers, then melt homogenised in an extruder and finally pelletised.

The extruder used in the compounding can be of any type known in the art. It may be either a single screw extruder which contains only one screw or a twin screw extruder which contains two parallel screws, or a combination of these. Preferably a twin screw extruder is used.

The twin screw extruder may be of either corotating or counterrotating type. In a corotating twin screw extruder the screws rotate in the same direction while in a counterrotating twin screw extruder the screws rotate in the opposite directions.

The following non-limiting examples illustrate the invention:

Description of Analytical Methods

Dart Drop

Dart drop is measured using the ISO 7765-1 method. A dart with a 38 mm diameter hemispherical head is dropped from a height of 0.66 m onto a film clamped over a hole. If the specimen fails, the weight of the dart is reduced and if it does not fail the weight is increased. At least 20 specimen need to be tested. A weight resulting failure of 50% of the specimen is calculated.

Tensile Strength at Yield

Tensile strength at yield is obtained from a tensile experiment. The experiment is performed according to the ISO 1184 method. The specimen is extended along its major axis at a constant speed.

Secant Modulus

Secant modulus at 1% elongation is also obtained from a tensile test. The value is the ratio of stress to strain at 1% strain on the stress-strain curve.

Tear Strength

Tear strength is measured using ISO 6383. method. The force required to propagate tearing across a film specimen is measured using a pendulum device. The pendulum swings by gravity through an arc, tearing the specimen from a precut slit. The specimen is held on one side by the pendulum and on the other side by a stationary member. Tear strength is the force required to tear the specimen.

Gel Count

Scanner Method: The gel count in Examples 8 to 13 was determined using a gel scanner. A film sample of a standard size (A4) was placed in the scanner which classified the gels in three categories according to their size: those between 0.1 mm and 0.3 mm, those between 0.3 mm and 0.7 mm and those larger than 0.7 mm. The numbers were then recalculated to indicate the number of gels per square meter in each category.

Manual Method: The gel count in Examples 14 to 19 was determined manually. The film sample (of size A4) was investigated under a polarised light. The gels were then marked and counted. The number of gels per A4 size was then given as the result.

Rheological Measurements

The rheology of polymers has been determined using Rheometrics RDA II Dynamic Rheometer. The measurements have been carried out at 190° C. temperature under nitrogen atmosphere. The measurements give storage modulus (G') and loss modulus (G") together with absolute value of complex viscosity viscosity ($\eta^*$) as a function of frequency ($\omega$) or absolute value of complex modulus ($G^*$).

$$\eta^* = \sqrt{(G'^2 + G''^2)}/\omega$$

$$G^* = \sqrt{(G'^2 + G''^2)}$$

According to Cox-Merz rule complex viscosity function, $\eta^*(\omega)$ is the same as conventional viscosity function (viscosity as a function of shear rate), if frequency is taken in rad/s. If this empiric equation is valid absolute value of complex modulus corresponds shear stress in conventional (that is stedy state) viscosity measurements. This means that function $\eta^*(G^*)$ is the same as viscosity as a function of shear stress.

In the present method viscosity at a low shear stress or $\eta^*$ at a low $G^*$ (which serve as an approximation of so called zero viscosity) is used as a measure of average molecular weight. On the other hand, shear thinning, that is the decrease of viscosity with $G^*$, gets more pronounced the broader is molecular weight distribution. This property can be approximated by defining a so called shear thinning index, SHI, as a ratio of viscosities at two different shear stresses. In the examples below the shear stresses (or $G^*$) 5 kPa and 300 kPa have been used. Thus:

$$SHI_{5/300} = \eta^*_5 / \eta^*_{300}$$

wherein $\eta^*_5$ is complex viscosity at $G^* = 5$ kPa and $\eta^*_{300}$ is complex viscosity at $G^* = 300$ kPa As mentioned above storage modulus function, $G'(\omega)$, and loss modulus function, $G''(\omega)$, are obtained as primary functions from dynamic measurements. The value of the storage modulus at a specific value of loss modulus increase with broadeness of molecular weight distribution. However this quantity is highly dependent on the shape of molecular weight distribution of the polymer. In the examples the value of G' at G"=5 kPa is used.

Volatiles

The volatility of polyethylene is determined by heating a weighed amount of polymer at 105° C. for 30 minutes. The sample is then weighed again and the reduction of weight is reported as the volatiles content.

Reference Example 1

A commercially available material sold under the trade name Hostalen GM 9240 HT from a dual slurry reactor process was analysed. The results are shown in Table 1.

Reference Example 2

Another commercially available material sold under the trade name HE6991 from a dual slurry reactor process was analysed. The results are shown in Table 1.

EXAMPLE 1

Polymerization Catalyst

1. Preparation of a Complex 8.6 g (66.4 mmol) of 2-ethyl-1-hexanol was added slowly to 27.8 g (33.2 mmol) of 19.9% butyl-octyl-magnesium. The reaction temperature was kept below 35° C. This complex was used in the following catalyst preparation. The ratio between 2-ethyl-1-hexanol and butyl-octyl-magnesium was 2:1.

2. Preparation of Catalyst 3.7 g (1.0 mmol/g carrier) of 20% EADC was added to 5.9 g of Sylopol 5510 silica/$MgCl_2$ carrier and the mixture was stirred for one hour at 30° C. 5.7 g (0.9 mmol/g carrier) of the complex prepared above in paragraph 1 was added and the mixture was stirred for 5 hours at 45° C. 0.6 g (0.55 mmol/g carrier) of $TiCl_4$ was added and the mixture stirred for five hours at 45° C. The catalyst was dried at 45–80° C. for three hours.

EXAMPLE 2

A commercial plant comprising a loop and a gas phase reactor was operated so that ethylene, propane diluent and hydrogen were introduced into a loop reactor together with the catalyst prepared according to Example 1. The operating temperature of the reactor was 95° C. and pressure 60 bar. Ethylene homopolymer was produced at a rate of 7 tons per hour and the $MFR_2$ of the polymer after the loop reactor was 400 g/10 min. Thus, the low molecular weight component was made in the loop reactor. The density of the polymer was not measured, but prior experience has indicated that a homopolymer of this MFR has a density of about 974 kg/$m^3$. The polymer slurry was withdrawn from the reactor and introduced into a separation stage where the hydrocarbons were removed from the polymer. The polymer containing the active catalyst was transferred into a gas phase reactor, where additional ethylene, hydrogen and 1-butene comonomer were added. the polymerisation was thus continued to produce the high molecular weight component so that a polymer composition having a density of 946 kg/$m^3$ and $MFR_2$, of 6.3 g/10 min was produced. The polymer was withdrawn from the gas phase reactor at a rate 16 tons per hour. The polymer was pelletised using a corotating twin screw extruder and analysed. Process data is shown in Table 1. Analysis results are presented in Table 2.

EXAMPLES 3 AND 4

Examples 3 and 4 were carried out in a similar way as Example 2, except that the material was produced in a pilot plant. The production rate in the loop reactor was 35 kg/h and the polymer was withdrawn from the gas phase reactor at a rate of 80 kg/h. The material was pelletised with a corotating twin screw extruder and analysed. Process data is shown in Table 1. Analysis results are shown in Table 2.

EXAMPLES 5

Example 5 was carried out in a similar way as Example 3 with the exception that an unsupported catalyst was used.

The catalyst was based on $MgCl_2$ and $TiCl_4$, sold under the trade name Lynx 760 by Mallinkrodt. The production rate in the loop reactor was 35 kg/h and the polymer was withdrawn from the gas phase reactor at a rate of 80 kg/h. The material was pelletised with a corotating twin screw extruder and analysed. Process data is shown in Table 1. Analysis results are shown in Table 2.

EXAMPLE 6

Example 6 was carried out in a similar way as Example 3 with the exception that a supported catalyst sold under the trade name XPO5002 (Grace) was used. The production rate in the loop reactor was 35 kg/h and the polymer was withdrawn at a rate of 80 kg/h. The material was pelletised with a corotating twin screw extruder and analysed. Process data is shown in Table 1. Analysis results are shown in Table 2.

EXAMPLE 7

The commercial plant described in Example 2 was operated according to Example 2 with the exception that a different catalyst, prepared according to PCT Patent Application No. WO95/35323. The polymer was then stabilised and compounded using counterrotating twin screw extruder. Process data is shown in Table 1 Analysis results are shown in Table 2.

Comparative Examples 1 and 2

Comparative examples 1 and 2 were carried out in a similar way as Example 3, except that the material was produced in the presence of a catalyst prepared according to Example 3 of the PCT application No. WO 95/35323. The process data can be found in Table 1 and analysis results in Table 2.

TABLE 1

| Example | E2 | E3 | E4 | E5 | E6 | E7 | CE1 | CE2 |
| --- | --- | --- | --- | --- | --- | --- | --- | --- |
| $H_2/C_2$, loop mol/kmol | N/A | 595 | 543 | 834 | 736 | 374 | N/A | N/A |
| $C_4/C_2$, loop mol/kmol | N/A | 24 | — | — | — | — | N/A | N/A |
| Density, loop kg/m³ | N/A | 971 | 973 | 973 | 971 | 973 | 975 | 975 |
| $MFR_2$, loop g/10 min | 460 | 490 | 650 | 600 | 310 | 720 | 1160 | 1180 |
| $H_2/C_2$, gpr mol/kmol | 29 | 25 | 27 | 40 | 48 | 22 | 16 | 16 |
| $C_4/C_2$, gpr mol/kmol | N/A | 114 | 177 | 168 | 171 | 160 | N/A | N/A |
| Split loop/gpr | 42/58 | 42/58 | 42/58 | 42/58 | 42/58 | 42/58 | 47/53 | 47/53 |
| $MFR_{21}$ g/10 min | 6.3 | 5.6 | 6.3 | 6.3 | 5.6 | 5.9 | 9.3 | 9.5 |
| Density kg/m³ | 947 | 946 | 946 | 945 | 944 | 946 | 950 | 950 |

TABLE 2

| Example | RE1 | RE2 | E2 | E3 | E4 | E5 | E6 | E7 | CE1 | CE2 |
| --- | --- | --- | --- | --- | --- | --- | --- | --- | --- | --- |
| $MFR_{21}$, g/10 min | 5.6 | 7.2 | 6.3 | 5.6 | 6.3 | | 5.6 | 12.3 | 9.3 | 9.5 |
| Density, kg/m³ | 944 | 948 | 947 | 946 | 946 | 945 | 944 | 948 | 950 | 950 |
| $\eta_{5kPa}$ (kpa · s) | 408 | 186 | 152 | 238 | 200 | 186 | 221 | 124.8 | 370.8 | 129.1 |
| $SHI_{5/300}$ | 144 | 114 | 70 | 92 | 90 | 72 | 73 | 58 | 230 | 81 |
| $G'_{5kPa}$ (Pa) | 4110 | 3290 | 2910 | 3250 | 3210 | 2640 | 2880 | 2281 | 4576 | 2586 |

EXAMPLES 8–13

The materials of the Examples 2 to 7 were blown to film on a Collin film line with a die diameter 30 mm and a die gap 0.75 mm. The results are shown in Table 3.

Comparative Examples 3 and 4

The materials of the Comparative Examples 1 and 2 were blown to film on Collin line with a die diameter 30 mm and a die gap 0.75 mm. The results are shown in Table 3.

TABLE 3

| Example | RE3 | E8 | E9 | E10 | E11 | E12 | E13 | CE3 | CE4 |
| --- | --- | --- | --- | --- | --- | --- | --- | --- | --- |
| Gels 0.1–0.3 | 378 | 365 | 126 | 363 | 275 | 215 | 200 | N/A | N/A |
| Gels 0.3–0.7 | 0 | 22 | 0 | 0 | 7 | 7 | 15 | N/A | N/A |
| Gels >0.7 | 0 | 0 | 0 | 0 | 0 | 0 | 0 | N/A | N/A |
| Gels n/A4 | N/A | 60 | N/A | N/A | N/A | N/A | N/A | 400 | 130 |
| Dart drop, g | 244 | 254 | 321 | 326 | 266 | 540 | 185 | <20 | 212 |
| Melt fracture | None | None | None | None | None | Some | None | Yes | Yes |

EXAMPLES 14–19

The materials of Examples 2 to 7 were blown to film on an Alpine film line with a die diameter 160 mm and a die gap 1.5 mm. The blow-up ratio (BUR) was 4 and the frost line height equal to 8 die diameters (DD). The results are shown in Table 4.

TABLE 4

| Example | RE4 | E14 | E15 | E16 | E17 | E18 | E19 |
| --- | --- | --- | --- | --- | --- | --- | --- |
| Gels | 5 | 56 | 50 | 50 | 5 | 20 | 25 |
| Dart drop, g | 280 | 225 | 260 | 340 | 360 | 400 | 190 |
| Tear (MD), N | 0.12 | 0.08 | 0.12 | 0.27 | 0.11 | 0.11 | 0.11 |
| Tear (TD), N |  | 1.07 | 0.93 | 0.91 | 1.03 | 0.90 | 2.5 |
| Neck, mm | 110 | 140 | 128 | 133 | 150 | 130 | 143 |
| Melt fracture | None | None | None | Some | None | None | None |

As apparent from the above results, blown films with good mechanical properties and good appearance can be produced from the present HDPE materials.

EXAMPLE 20

The level of volatiles in the pelletised product prepared according to Reference Example 2 was 500 to 800 ppm. By contrast, the level of volatiles in the pelletised product prepared according to Example 2 has been measured twice, the average of the measurements being 180 ppm.

What is claimed is:

1. A high density polyethylene film, comprising a bimodal polyethylene composition comprising at least two polyethylene components wherein one component has an $MFR_2$ range of 300–1000 g/10 min and another component has an $MFR_{21}$ range of the final polymer of 4–12 g/10 min wherein, the composition has a shear thinning index defined by the relationship:

$$SHI_{5/300} \leq 0.00014 \eta_{5kPa} + 78$$

wherein $\eta_{5kPa}$ is the complex viscosity at $G^*=5$ kPa and $SHI_{5/300}$ is the ratio of complex viscosity at $G^*=5$ kPa to the complex viscosity at $G^*=300$ kPa and wherein the film withstands a dart drop greater than 200 g and has a gel count of less than 50.

2. The film according to claim 1, wherein the thickness of the film is 5–30 μm.

3. The film according to claim 1, wherein the bimodal polyethylene composition holds $$G'_{5kPa} \geq 28 \cdot SHI_{5/300} + 425$$

wherein $G'_{5kPa}$ is the storage modulus measured at a point where the loss modulus has a value of 5 kPa.

4. The film according to claim 1, wherein the polyethylene component with the $MFR_2$ in the range of 300–1000 g/10 min has a density above 960 kg/m³ and the bimodal polyethylene composition has a density of 940 to 965 kg/m³ and an $MFR_{21}$ of 3 to 50.

5. The film according to claim 1, wherein the bimodal polyethylene composition contains about 50 to 70 wt-% of the polymer component with the $MFR_{21}$ in the range of 4–12 g/10 min and 30 to 50% of the polymer component with the $MFR_2$ in the range of 300–1000 g/10 min.

6. The film according to claim 1, wherein the bimodal polyethylene composition contains up to 5% of a comonomer selected from the group of 1-propylene, 1-butene, 1-pentene, 1-hexene, 4-methyl-1-pentene, 1-heptene, 1-octene, 1-nonene and 1 decene and mixtures thereof, and the component with a low molecular weight contains less than 1% comonomer.

7. The film according to claim 1, wherein the amount of volatiles is less than 500 ppm.

8. The film according to claim 1, wherein the amount of volatiles is less than 300 ppm.

* * * * *